United States Patent
Oliveira et al.

(10) Patent No.: US 9,507,320 B2
(45) Date of Patent: Nov. 29, 2016

(54) METHOD FOR TRANSFERRING SURFACE TEXTURES, SUCH AS INTERFERENCE LAYERS, HOLOGRAMS AND OTHER HIGHLY REFRACTIVE OPTICAL MICROSTRUCTURES

(75) Inventors: Peter William Oliveira, Saarbruecken (DE); Bruno Schaefer, Losheim am See (DE); Christine Faller-Schneider, Voelklingen (DE); Michael Veith, St. Ingbert (DE)

(73) Assignee: LEIBNIZ-INSTITUT FUER NEUE MATERIALIEN GEMEINNUETZIGE GESELLSCHAFT MIT BESCHRAENKTER HAFTUNG, Saarbruecken (DE)

( * ) Notice: Subject to any disclaimer, the term of this patent is extended or adjusted under 35 U.S.C. 154(b) by 349 days.

(21) Appl. No.: 12/449,593

(22) PCT Filed: Feb. 14, 2008

(86) PCT No.: PCT/DE2008/000273
§ 371 (c)(1),
(2), (4) Date: Sep. 23, 2009

(87) PCT Pub. No.: WO2008/098567
PCT Pub. Date: Aug. 21, 2008

(65) Prior Publication Data
US 2010/0032083 A1    Feb. 11, 2010

(30) Foreign Application Priority Data

Feb. 15, 2007   (DE) .................. 10 2007 008 073
Apr. 25, 2007   (DE) .................. 10 2007 019 866

(51) Int. Cl.
*B44C 1/165*   (2006.01)
*B44C 1/17*    (2006.01)
(Continued)

(52) U.S. Cl.
CPC ............... *G03H 1/0252* (2013.01); *B44C 1/17* (2013.01); *C03C 17/3411* (2013.01);
(Continued)

(58) Field of Classification Search
USPC ........ 156/230, 240, 247, 249; 264/1.31–1.38
See application file for complete search history.

(56) References Cited

U.S. PATENT DOCUMENTS 3,658,611 A * 4/1972 Gray ..................... 156/89.24
4,650,535 A * 3/1987 Bennett et al. .......... 156/352
(Continued)

FOREIGN PATENT DOCUMENTS

DE    41 30 550    3/1993
DE    44 17 405   11/1995
(Continued)

OTHER PUBLICATIONS

English translation of WO98/22648 by Schmidt et al. May 1998.*
(Continued)

*Primary Examiner* — Sing P Chan
(74) *Attorney, Agent, or Firm* — Collard & Roe, P.C.

(57) ABSTRACT

The invention relates to a method for transferring surface structures such as interference layers, holograms, and other highly refractive optical microstructures to substrates. The aim of the invention is to devise a method which is used for transferring surface structures such as interference layers, holograms, and other highly refractive optical microstructures to substrates and can also be used in a high temperature range. The aim is achieved by a method comprising the following steps: a) a flexible intermediate support layer is applied to a support film as a release layer; b) an embossed sol is applied to the intermediate support layer and is provided with a surface structure; c) a stack encompassing a binder layer and the surface structure is produced; d) the support film is removed; e) the workpiece is thermally treated.

8 Claims, 2 Drawing Sheets

Figure 1:
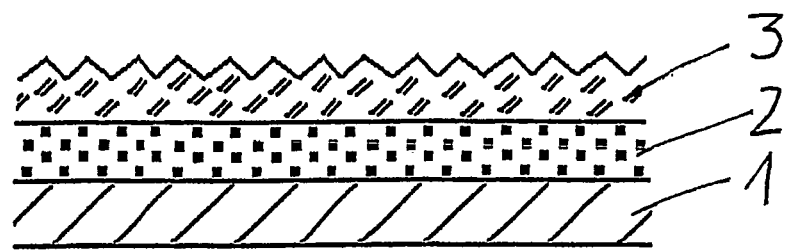

(51) Int. Cl.
*B32B 37/06* (2006.01)
*B32B 37/26* (2006.01)
*B32B 38/10* (2006.01)
*B29C 65/02* (2006.01)
*G03H 1/02* (2006.01)
*C03C 17/34* (2006.01)
*C04B 41/00* (2006.01)
*C04B 41/45* (2006.01)
*C04B 41/81* (2006.01)
*G03H 1/18* (2006.01)

(52) U.S. Cl.
CPC ........ *C04B 41/009* (2013.01); *C04B 41/4511* (2013.01); *C04B 41/81* (2013.01); *C03C 2217/72* (2013.01); *C03C 2218/113* (2013.01); *C03C 2218/335* (2013.01); *G03H 1/0244* (2013.01); *G03H 1/182* (2013.01); *G03H 2250/10* (2013.01)

(56) References Cited

U.S. PATENT DOCUMENTS

| | | | |
|---|---|---|---|
| 4,824,498 A * | 4/1989 | Goodwin et al. | 156/71 |
| 4,856,857 A * | 8/1989 | Takeuchi et al. | 359/3 |
| 5,318,816 A | 6/1994 | Yin et al. | |
| 5,702,805 A | 12/1997 | Yin et al. | |
| 5,716,679 A | 2/1998 | Krug et al. | |
| 5,766,680 A | 6/1998 | Schmidt et al. | |
| 6,287,639 B1 | 9/2001 | Schmidt et al. | |
| 6,352,610 B1 * | 3/2002 | Schmidt et al. | 156/313 |
| 6,378,599 B1 | 4/2002 | Schmidt et al. | |
| 6,468,380 B1 * | 10/2002 | Christuk et al. | 156/244.16 |
| 6,694,885 B2 | 2/2004 | Geddes et al. | |
| 6,766,734 B2 | 7/2004 | Geddes et al. | |
| 6,847,483 B2 * | 1/2005 | Lippey et al. | 359/443 |
| 6,854,386 B2 | 2/2005 | Geddes et al. | |
| 6,855,371 B2 * | 2/2005 | Gier | B05D 3/12 427/271 |
| 7,149,013 B2 | 12/2006 | Menz et al. | |
| 7,420,720 B2 | 9/2008 | Menz et al. | |
| 7,563,545 B2 * | 7/2009 | Ishida | 430/1 |
| 2003/0141607 A1 * | 7/2003 | Leiber et al. | 264/1.33 |
| 2004/0144479 A1 | 7/2004 | Cueli | |
| 2005/0082526 A1 | 4/2005 | Bedell et al. | |
| 2006/0162840 A1 * | 7/2006 | Abraham | 156/64 |

FOREIGN PATENT DOCUMENTS

| | | |
|---|---|---|
| DE | 196 33 675 | 2/1998 |
| DE | 196 47 368 | 5/1998 |
| DE | 100 01 135 | 7/2001 |
| EP | 1 248 685 | 10/2002 |
| EP | 1 614 664 | 1/2006 |
| EP | 1 632 362 | 3/2006 |
| JP | 2003-280498 | 10/2003 |
| JP | 2004-358925 | 12/2004 |
| KR | 2002-024286 | 3/2002 |
| WO | WO 93/16888 | 9/1993 |
| WO | WO 98/22648 | 5/1998 |
| WO | WO 02/097537 | 12/2002 |

OTHER PUBLICATIONS

English translation of description and claims of WO98/22648; May 1998.*
International Search Report.
Leibniz-Institut fur Neue Materialien: Jahresbericht 2005, Saarbruecken, pp. 6-20. (With English Abstracts of each section and English Abstracts of each drawing) (German Exam. Report).

* cited by examiner

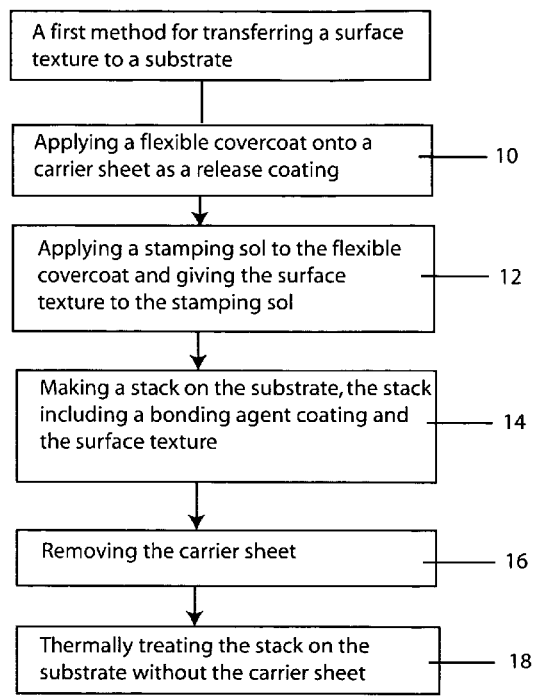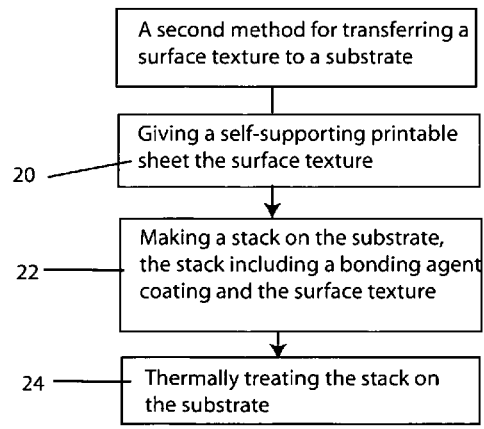

METHOD FOR TRANSFERRING SURFACE TEXTURES, SUCH AS INTERFERENCE LAYERS, HOLOGRAMS AND OTHER HIGHLY REFRACTIVE OPTICAL MICROSTRUCTURES

CROSS REFERENCE TO RELATED APPLICATIONS

This application is the National Stage of PCT/DE2008/000273 filed on Feb. 14, 2008, which claims priority under 35 U.S.C. §119 of German Application No. 10 2007 008 073.7 filed on Feb. 15, 2007 and German Application No. 10 2007 019 866.5 filed on Apr. 25, 2007. The international application under PCT article 21(2) was not published in English.

The invention concerns a method for transferring surface textures, such as interference layers, holograms and other highly refractive optical microstructures onto substrates.

Possible substrates are in particular glass, ceramic and metal surfaces.

The use of transfer sheets for transferring patterns onto various backgrounds, whereby the pattern can also be burned in over or under a glaze, is for example known from U.S. Pat. No. 6,766,734, U.S. Pat. No. 6,694,885 and U.S. Pat. No. 6,854,386.

The application of hologram decals on paper or plastic backgrounds is also quite common, as can be seen for example in U.S. Pat. No. 5,702,805 and U.S. Pat. No. 5,318,816.

From KR 2002/024286 A, a hologram decal and its manufacturing processes are known which are, however, not suitable for glass or ceramic surfaces. JP 2004/358925 A describes a hologram decal, but it is not burnable nor is the transfer sheet carrying a hologram and described in JP 2003/280498 A suitable for glass or ceramic surfaces, which is also the case with the object of U.S. Pat. No. 5,702,805 A.

From WO 98/22648 A2, a composite material is known which is characterized by a substrate and a nanocomposite being in functional contact with it, which can be obtained by modifying the surface of
a) colloidal inorganic particles with
b) one or more silanes of the general formula

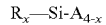

$$R_x\text{—Si-A}_{4-x}$$

where the radicals A are identical or different and represent hydroxyl groups or groups that can be removed hydrolytically, except methoxy, where the radicals R are identical or different and represent groups that cannot be removed hydrolytically and x has the value 0, 1, 2 or 3, with x≥1 in at least 50 mol % of the silanes;
under the conditions of the sol-gel process with an understoichiometric amount of water, based on the hydrolysable groups which are present, with formation of a nanocomposite sol, and further hydrolysis and condensation of the nanocomposite sol, if desired, before being brought into contact with the substrate and following curing, said substrate not being a glass or mineral fiber or vegetable material.

The purpose of the invention is therefore to come up with a method for transferring interference layers, holograms and other highly refractive optical microstructures onto a substrate, which can also be used in the high temperature range.

This purpose of the invention is achieved by a method for transferring surface textures, such as interference layers, holograms and other highly refractive optical microstructures, onto a substrate, which includes the following process steps:
a) A flexible covercoat is applied to a carrier sheet as a release coating,
b) A stamping sol is applied to this covercoat and provided with surface texture,
c) Making a stack, consisting of a bonding agent coating and the surface texture, whereby the bonding agent is applied directly to the surface texture and this stack is then transferred to the substrate,
d) Removal of the carrier sheet,
e) Thermal treatment of the workpiece.

In this way a flexible covercoat is applied to the carrier sheet as a release coating.

The stamping sol, which should have a sufficiently different refractive index from the adhesive, is applied to this covercoat and provided with a surface texture, e.g. a hologram or another optical microstructure.

Subsequently, a stack is formed of a bonding agent coating and the surface texture.

Then the carrier sheet is removed.

The purpose of the invention is also achieved by a method for transferring surface textures, such as interference layers, holograms and other highly refractive optical microstructures, onto a substrate, which involves the following process steps:
a) A self-supporting printable sheet is given a surface texture,
b) Making a stack consisting of a bonding agent coating and the surface texture, whereby the bonding agent is applied directly to the surface texture and this stack is then transferred to the substrate,
c) Thermal treatment of the workpiece.

In this variant of the invention a self-supporting flexible, printable sheet is used directly with the flexible covercoat instead of the carrier sheet. In this case the latter is given a surface texture and covered with a highly refractive coating. In this process the stamping procedure can, however, also take place directly on it after the application of the highly refractive coating.

Finally the workpiece is treated thermally, so that in the end only the structured highly refractive coating adheres to the substrate surface by means of the bonding agent coating.

With such a transfer sheet one can transfer an interference layer, a hologram or another optical microstructure onto a substrate, whereby the transferred coatings are preserved in the transfer process so that an additional drying and oven baking process in the high temperature range are possible.

The advantages of the invention essentially are that a transfer sheet stable under high temperatures is created which can be applied to hot materials or materials that are heated later, and that is durable. This means also that the transferred interference layers, holograms and other optical microstructures cannot be removed or damaged by later thermal treatment. Besides, the transfer sheet can be produced on a sheet coating system with an attached stamping station in the form of film rolls and is therefore suitable for mass production.

It is thus, for example, possible to transfer a hologram on substrates that are still hot or also a hologram to a substrate that is heated during use in the high temperature range, e.g. an engine mount or a vehicle catalyst. This opens up new possibilities to provide even such parts with safety characteristics, for example a verifiable hologram, in order to make sure that they are not fakes.

The optically effective principle of the invention is based on a sufficiently large difference in the refractive index between the optical microstructure and the bonding agent coating. This aspect makes a special variability possible since the hologram and/or the optical coating in combination with the bonding agent can be used for controlling the optical effects. Thus, for example, it becomes possible to manufacture coating stacks that are stable in high temperatures which work collectively like a reflection or antireflection coating, and/or like a hologram. In this process it is possible, for example, to provide only the surface of the relief hologram (or the optical coating) with a coating that has an adequate refractive index or the hologram (and/or the optical coating) can be made entirely of a material with the desired refractive index. In this connection it is of interest that the refractive index of the bonding agent can be adjusted by using highly refractive nanoparticles instead of $SiO_2$ nanoparticles.

It is also within the perimeter of the invention that relief holograms are textured via simple or thixotropic stamping.

A thixotropically structured material is, for example known from EP 1 248 685 B1. Also disclosed is a stamping sol which is an organically modified inorganic polycondensate or precursors thereof.

An embodiment of the invention consists in that in step c) a bonding agent coating is applied to the substrate and dried, and that the surface texture is afterwards transferred onto the bonding agent coating.

It is within the perimeter of the invention that the bonding agent consists of a nanocomposite which can be obtained by modifying the surface of
a) colloidal inorganic particles with
b) one or more silanes of the general formula

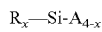

where the radicals A are identical or different and represent hydroxyl groups or groups that can be removed hydrolytically, except methoxy, where the radicals R are identical or different and represent groups that cannot be removed hydrolytically and x has the value 0, 1, 2 or 3, with x≥1 in at least 50 mol % of the silanes; under the conditions of the sol-gel process with an understoichiometric amount of water, based on the hydrolysable groups which are present, with formation of a nanocomposite sol, and further hydrolysis and condensation of the nanocomposite sol, if desired.

In the method according to the invention it is also useful if the substrate is a glass surface, ceramic surface or metal surface.

It is also advantageous if the carrier sheet is a polyethylene sheet or a polyimide sheet.

It is advantageous if the covercoat is a sheet on a polyvinyl alcohol basis.

It is also within the perimeter of the invention that the self-supporting printable sheet is a sheet on a polyvinyl alcohol basis.

The invention also includes that in step e) the thermal treatment takes place at temperatures up to 800° C., preferably at temperatures up to 450° C.

Finally, the invention also provides that in the second alternative concerning step c) transfer to a hot substrate takes place in step e), whereby the substrate temperature is about 80° C. to 800° C., preferably 100° C. to 600° C., with particular preference for the range from 150° C. to 450° C.

As follows, the invention is described using illustrations and an example of an embodiment.

Figure 2:
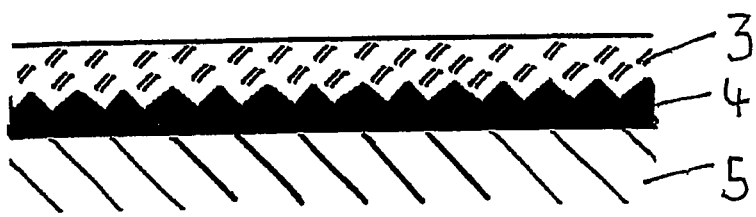

The illustrations show the following:

FIG. 1 A schematic representation of a transfer sheet for the method according to the invention;

FIG. 2 A hologram structure after it has been fixated on a substrate;

FIG. 3 A first method for transferring a surface texture to a substrate; and

FIG. 4 A second method for transferring a surface texture to a substrate.

As FIG. 1 shows, the transfer sheet used in the method according to the invention consists of a carrier sheet 1, which may be for example a polyethylene or a polyimide sheet.

On this carrier sheet 1 a covercoat 2 (or release coating) containing in particular polyvinyl alcohol (PVA) and possibly additives, in particular fluoridated additives (e.g. zonyl) or additives with similar effects, is applied with a coating thickness of approx. 40 μm as shown in step 10 in FIG. 3, onto which in turn a highly refractive coating 3 is applied as shown in step 12 in FIG. 3. The covercoat 2 is used because the adhesion between the carrier sheet 1 and the highly refractive coating 3 would be too strong.

A hologram structure is imprinted on the highly refractive coating 3 as is also shown in step 12 in FIG. 3.

Via the inorganic bonding agent 4, as is used for the production of a composite material in WO 98/22648 A2, the transfer sheet is applied onto a substrate 5 which preferably has a glass, ceramic or metal surface, with the highly refractive coating turned to the substrate 5 as shown in step 14 in FIG. 3. The carrier sheet 1 must be removed together with the covercoat 2 before the thermal treatment as shown in step 16 in FIG. 3. Fixation (burnout) takes place after the curing of the bonding agent coating 4, with the result that in the end only the structured highly refractive coating 3 adheres to the substrate by means of the bonding agent coating 4 (FIG. 2) as shown in step 18 in FIG. 3.

In this process the transferred structures with a periodicity of approx. 4 μm are preserved during the transfer process on an area of 1 cm², allowing for an additional drying and oven-baking process at temperatures of 450° C. and in individual cases also up to 800° C.

In the second method of the invention for transferring a surface texture onto a substrate, as shown in FIG. 4, a self-supporting printable sheet is given a surface texture as shown in step 20 in FIG. 4, a stack is made on the substrate as shown in step 22 in FIG. 4, the stack including a bonding agent coating and the surface texture, and the stack on the substrate is thermally treated as shown in step 24 in FIG. 4.

EXAMPLE OF AN EMBODIMENT

1 Production of the Sol 1.1 Adhesive Sol 142 g of silica sol Levasil 300/30 and 4 ml of a 37% HCl solution are added to the present 327.5 g methyltriethoxysilane and 95.5 g tetraethyl orthosilicate and stirred. After cooling the solution by about 15° C., a mixture of 327.5 g methyltriethoxysilane and 95.5 g tetraethyl orthosilicate of the reaction solution is admixed.

1.2 Stamping Sol 22.43 g isopropanol is to be added to 4.46 g titan isopropylate quickly under constant stirring (part of 1). Then 0.68 g of a 16.9% HCl solution is added to 22.43 g of 1-butanol and stirred (Part 2). Part 2 is to be added to Part 1 and stirred.

1.3 Release Sol 4.22 g isopropanol and a mixture consisting of 1.083 g distilled water with 0.007 g Tween 80 is admixed to 36.50 g of approx. 8 percent polyvinyl alcohol (PVA, Poval 235) dissolved in water. A mixture of 0.16 g diethylene glycol, 0.08 g Zonyl FS-300 and 1.09 g is added to an aliquot of 38.56 g of the aforementioned PVA solution and stirred.

2 Making the Coating stack: Release, Printable Coating and Texturing of the Printable Coating 2.1 Making the Release Coating The release sol described under point 1.3 is applied onto a PET carrier sheet using a 400 μm coating knife and dried at 150° C. for 20 min.

2.2 Making the Printable Coating

The stamping sol described under point 1.2 is applied to the release coating by flooding.

2.3 Texturing the Printable Coating

A relief hologram is etched into the wet film using a silicone rubber stamp. The stamp must be applied with a pressure of approx. 1 kg per square centimeter for approx. 1 second. After a rest period of 30 minutes the solvent is diffused into the silicone rubber so that the dried printable coating has sufficient firmness and the silicone rubber stamp can be removed.

3 Transfer of the hologram onto a substrate 3.1 Transfer of the hologram onto glass The glass substrate must be coated with the adhesive by dip coating at 1 mm/s. After evaporation of the solvent at RT [room temperature] for approx. 1 h, the textured coating stack described under point 2 can be laminated onto the glass substrate. The glass substrate must then be heated for 8 h at 80° C., and within 4 h to 450° C. The temperature of 450° C. must be held for 1 h; then the workpiece must be cooled within 4 h to 20° C. 3.2 Transfer of the Hologram onto Ceramic The ceramic substrate must be coated with the adhesive (dip coating 1 mm/s). After evaporation of the solvent at RT for approx. 1 h, the textured coating stack described under point 2 can be laminated onto the ceramic. The ceramic substrate must then be heated for 8 h at 80° C., and within 4 h to 450° C. The temperature of 450° C. must be held for 1 h; then the workpiece must be cooled within 4 h to 20° C.

3.3 Transfer of the Hologram onto High-Grade Steel

The high-grade steel substrate must be coated with the adhesive (dip coating 1 mm/s). After evaporation of the solvent at RT for approx. 1 h, the textured coating stack described under point 2 can be laminated onto the high-grade steel. The high-grade steel substrate must then be heated for 8 h at 80° C., and within 4 h to 450° C. The temperature of 450° C. must be held for 1 h; then the workpiece must be cooled within 4 h to 20° C.

The invention claimed is:

1. A method for transferring a surface texture comprising a highly refractive optical microstructure to a substrate having a glass surface, a ceramic surface, or a metal surface, the method comprising the following process steps:
   a) applying a flexible covercoat onto a carrier sheet as a release coating;
   b) applying a stamping sol to the flexible covercoat and giving the surface texture to the stamping sol; and said stamping sol is an organically modified inorganic polycondensate or precursors thereof;
   c) making a stack on the substrate, the stack comprising an inorganic bonding agent coating and the surface texture, the bonding agent and the optical microstructure having a difference in refractive index, wherein the bonding agent coating is applied directly to the surface texture and the stack is then transferred to the substrate;
   d) removing the carrier sheet; and
   e) thermally treating the stack on the substrate without the carrier sheet, wherein as transfer of the optical microstructure to the substrate takes place, the substrate has a temperature treatment comprising the steps of heating the substrate for 8 hours at 80° C. and within 4 hours raising the temperature to 450° C.; holding the temperature at 450° C. for 1 hour, then cooling workpiece within 4 hours to 20° C.;
   wherein the bonding agent coating comprises a nanocomposite which can be obtained by modifying a surface of
   a) colloidal inorganic particles with
   b) at least one silane of the general formula

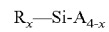
   $$R_x\text{—Si-}A_{4-x}$$

where the radical A represents a hydroxyl group or a group that can be removed hydrolytically, except methoxy, where the radical R represents a group that cannot be removed hydrolytically and x has the value 0, 1, 2 or 3, with x≥1 in at least 50 mol % of the at least one silane;
   under conditions of a sol-gel process with an under-stoichiometric amount of water, based on the radical A, with formation of a nanocomposite sol, and further hydrolysis and condensation of the nanocomposite sol.

2. The method according to claim 1, wherein the surface texture is a relief hologram; and
   wherein the relief hologram is given to the stamping sol via simple or thixotropic stamping.

3. The method according to claim 1, wherein the carrier sheet is a polyethylene sheet or a polyimide sheet.

4. The method according to claim 1, wherein the flexible covercoat is a sheet on a polyvinyl alcohol basis.

5. A method for transferring a surface texture comprising a highly refractive optical microstructure to a substrate having a glass surface, a ceramic surface, or a metal surface, the method comprising the following process steps:
   applying a stamping sol to a self-supporting printable sheet and giving the surface texture to the stamping sol; and said stamping sol is an organically modified inorganic polycondensate or precursors thereof; thereby giving the self-supporting printable sheet the surface texture;
   making a stack on the substrate, the stack comprising an inorganic bonding agent coating and the surface texture, the bonding agent and the optical microstructure having a difference in refractive index, wherein the bonding agent coating is applied directly to the surface texture and the stack is then transferred to the substrate; and
   thermally treating the stack on the substrate, wherein as transfer of the optical microstructure to the substrate takes place, the substrate has a temperature treatment comprising the steps of heating the substrate for 8 hours at 80° C. and within 4 hours raising the temperature to 450° C.; holding the temperature at 450° C. for 1 hour, then cooling workpiece within 4 hours to 20° C.;
   wherein the bonding agent coating comprises a nanocomposite which can be obtained by modifying a surface of
   a) colloidal inorganic particles with
   b) at least one silane of the general formula

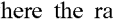
   $$R_x\text{—Si-}A_{4-x}$$

where the radical A represents a hydroxyl group or a group that can be removed hydrolytically, except methoxy, where the radical R represents a group that cannot be removed hydrolytically and x has the value 0, 1, 2 or 3, with x≥1 in at least 50 mol % of the at least one silane;

under conditions of a sol-gel process with an under-stoichiometric amount of water, based on the radical A, with formation of a nanocomposite sol, and further hydrolysis and condensation of the nanocomposite sol.

6. The method according to claim 5, wherein the self-supporting printable sheet is a sheet on a polyvinyl alcohol basis.

7. A method for transferring a surface texture comprising a highly refractive optical microstructure to a substrate having a glass surface, a ceramic surface, or a metal surface, the method comprising the following process steps:
  a) applying a flexible covercoat onto a carrier sheet as a release coating;
  b) applying a stamping sol to the flexible covercoat and giving the surface texture to the stamping sol; and said stamping sol is an organically modified inorganic polycondensate or precursors thereof;
  c) making a stack on the substrate, the stack comprising an inorganic bonding agent coating and the surface texture, the bonding agent and the optical microstructure having a difference in refractive index, wherein the bonding agent coating is applied onto the substrate and dried, and the surface texture is then transferred to the bonding agent coating;
  d) removing the carrier sheet; and
  e) thermally treating the stack on the substrate without the carrier sheet, wherein as transfer of the optical microstructure to the substrate takes place, the substrate has a temperature treatment comprising the steps of heating the substrate for 8 hours at 80° C. and within 4 hours raising the temperature to 450° C.; holding the temperature at 450° C. for 1 hour, then cooling workpiece within 4 hours to 20° C.;
wherein the bonding agent coating comprises a nanocomposite which can be obtained by modifying a surface of
a) colloidal inorganic particles with
b) at least one silane of the general formula $$R_x\text{—Si-}A_{4-x}$$

where the radical A represents a hydroxyl group or a group that can be removed hydrolytically, except methoxy, where the radical R represents a group that cannot be removed hydrolytically and x has the value 0, 1, 2 or 3, with x≥1 in at least 50 mol % of the at least one silane;

under conditions of a sol-gel process with an under-stoichiometric amount of water, based on the radical A, with formation of a nanocomposite sol, and further hydrolysis and condensation of the nanocomposite sol.

8. A method for transferring a surface texture comprising a highly refractive optical microstructure to a substrate having a glass surface, a ceramic surface, or a metal surface, the method comprising the following process steps:
  applying a stamping sol to a self-supporting printable sheet and giving the surface texture to the stamping sol; and said stamping sol is an organically modified polycondensate or precursor thereof; thereby
  giving the self-supporting printable sheet the surface texture;
  making a stack on the substrate, the stack comprising an inorganic bonding agent coating and the surface texture, the bonding agent and the optical microstructure having a difference in refractive index, wherein the bonding agent coating is applied onto the substrate and dried, and the surface texture is then transferred to the bonding agent coating; and
  thermally treating the stack on the substrate, wherein as transfer of the optical microstructure to the substrate takes place, the substrate has a temperature treatment comprising the steps of heating the substrate for 8 hours at 80° C. and within 4 hours raising the temperature to 450° C.; holding the temperature at 450° C. for 1 hour, then cooling workpiece within 4 hours to 20° C.;
  wherein the bonding agent coating comprises a nanocomposite which can be obtained by modifying a surface of
a) colloidal inorganic particles with
b) at least one silane of the general formula $$R_x\text{—Si-}A_{4-x}$$

where the radical A represents a hydroxyl group or a group that can be removed hydrolytically, except methoxy, where the radical R represents a group that cannot be removed hydrolytically and x has the value 0, 1, 2 or 3, with x≥1 in at least 50 mol % of the at least one silane;

under conditions of a sol-gel process with an under-stoichiometric amount of water, based on the radical A, with formation of a nanocomposite sol, and further hydrolysis and condensation of the nanocomposite sol.

* * * * *